United States Patent

[11] 3,632,210

[72] Inventor Theodore A. Rich
Scotia, N.Y.
[21] Appl. No. 834,822
[22] Filed June 19, 1969
[45] Patented Jan. 4, 1972
[73] Assignee Environment-One Corporation
Latham, N.Y.

[54] VARIABLE RATE CONTINUOUS FLOW CONDENSATION NUCLEI METER HAVING ADJUSTABLE EXPANSION PERIOD AND IMPROVED GAIN
26 Claims, 7 Drawing Figs.

[52] U.S. Cl. .................................................. 356/37,
73/17, 73/29, 92/60, 250/218, 356/103, 356/207
[51] Int. Cl. ........................................ G01n 1/00,
G01n 21/00, G01n 21/12
[50] Field of Search ............................ 356/36–38,
102–104, 207, 208; 250/218; 73/17 A, 29; 92/60;
417/395

[56] References Cited
UNITED STATES PATENTS

| | | | |
|---|---|---|---|
| 2,413,851 | 1/1947 | Taylor | 417/395 X |
| 2,684,008 | 7/1954 | Vonnegut | 356/37 |
| 2,938,423 | 5/1960 | Rich | 356/37 |
| 3,014,360 | 12/1961 | Herrmann | 92/60 X |
| 3,037,421 | 6/1962 | Bigelow et al. | 356/37 |
| 3,385,772 | 5/1968 | Barker et al. | 73/29 X |

Primary Examiner—Ronald L. Wibert
Assistant Examiner—Warren A. Sklar
Attorney—Charles W. Helzer ABSTRACT: A variable rate continuous flow condensation nuclei meter is described which includes an expansion chamber having inlet and outlet passageways for introducing into and withdrawing from the expansion chamber specimens of a sample gaseous atmosphere to be monitored for condensation nuclei. Inlet and outlet cutoff valves are disposed in the inlet and outlet passageway for allowing a specimen of a sample gaseous atmosphere being monitored to be drawn from an intake probe or other sample atmosphere intake arrangement through the inlet passageway and expansion chamber, out the outlet passageway and to a source of low pressure provided by a suitable evacuating apparatus. With the valves open, differential flow of a sample gaseous atmosphere takes place from the intake probe through the expansion chamber into the evacuated space. During each operating cycle the inlet and outlet valves are closed simultaneously for at least a short time duration sample interval to trap a specimen of the atmosphere being tested in the expansion chamber during the sample interval. At this point, the interior of the expansion chamber is suddenly decreased in pressure so as to form small liquid droplets around the condensation nuclei contained in the gaseous atmosphere as centers. A radiant energy irradiating and detecting device is positioned to view the interior of the expansion chamber and is operative during the sample interval to derive an output electric signal representative of the intensity of the radiant energy attenuated or scattered by the small liquid droplets thus formed on the condensation nuclei as centers. The output electrical signal thus derived comprises a measure of the number of condensation nuclei contained in the specimen of the gaseous atmosphere being tested during each sample interval. Following measurement the interior of the expansion chamber is recompressed to a pressure corresponding to its preexpansion value. A bypass flow path is connected in parallel with the expansion chamber and is designed such that with the inlet and outlet valves open, a portion of the flow of the sample gaseous atmosphere takes place through the expansion chamber, and with the inlet and outlet valves closed substantially all of the flow takes place through the bypass flow path and a continuous flow rate is maintained over a complete operating cycle and from one operating cycle to the next. Additional means are provided for variably controlling the flow rate of the sample gaseous atmosphere being monitored through the condensation nuclei meter by a suitable control valve or replaceable restriction located in a passageway common to the parallel connected expansion chamber and bypass path. The length of time or period of the expansion cycle apparatus employed with the condensation nuclei meter is separately adjustable independently of flow rate to provide a linear measurement of particle count over a wide range of particle concentrations.

INVENTOR
THEODORE A. RICH

BY Charles Hezer

ATTORNEY

VARIABLE RATE CONTINUOUS FLOW CONDENSATION NUCLEI METER HAVING ADJUSTABLE EXPANSION PERIOD AND IMPROVED GAIN

BACKGROUND OF INVENTION

1. Field of Invention

This invention relates to a new and improved condensation nuclei meter.

More particularly, the invention relates to a new and improved variable rate, continuous flow condensation nuclei meter for readily and accurately measuring condensation nuclei having widely different concentrations.

2. Statement of Prior Art

A condensation nuclei is an extremely small particle, sometimes referred to as an aerosol particle, which may be entrained in the air and other gaseous atmospheres in large numbers and may range in size from particles having a radius of about $2.5 \times 10^{-7}$ centimeters to $5 \times 10^{-4}$ centimeters. Condensation nuclei are produced in the atmosphere in many diverse ways either naturally or by reason of human activity. An example of condensation nuclei particles would be the very fine dust particles entrained in the air due to dust storms and the like. Other primary sources of condensation nuclei are evaporation of ocean water, atmospheric ionization due to naturally occurring radiation, smoke from combustion processes, evaporation from asphalt pavement, exhaust from internal combustion engines and other manmade sources of pollutants of the atmosphere.

Due to the extremely small size of condensation nuclei, they are difficult to measure since their size lies in a range extending from microscopic to submicroscopic and they are not readily observed. Consequently, the usual direct means of measurement using light absorption and light scattering techniques cannot be applied directly to the measurement of condensation nuclei. As the result, condensation nuclei measuring techniques have been developed which rely on the property of condensation nuclei to serve as the nucleus or center of condensation for a water droplet. By causing condensation of water (or other condensable liquid) about the nuclei as centers of condensation, their size can be increased by many orders of magnitude thereby allowing the usual techniques of light scattering and absorption to be employed in their measurement.

It has been determined that condensation nuclei serve as centers about which water droplets form, and unless they are present, condensation generally will not occur except at extreme degrees of supersaturation. For example it has been observed that condensation of water vapor does not take place in the absence of condensation nuclei at values of supersaturation below 400 percent, a condition which normally does not occur in nature and cannot readily be made to occur, even artificially. The mechanism involved in the condensation of water about a condensation nuclei as a center of condensation, generally is dependent both on the size of the condensation nuclei, and on the relative humidity of the gaseous atmosphere in which it is entrained. If the relative humidity of a gaseous atmosphere or air mass having condensation nuclei entrained therein tends to rise above 100 percent, such as would occur by a sudden cooling of the atmosphere, condensation starts the deposition of water on the nuclei as centers in order to achieve an equilibrium condition. The deposition of water will continue until the humidity is lowered to the new equilibrium condition representing substantially 100 percent relative humidity for the new, cooler temperature. As stated previously, the known condensation nuclei meters rely on this property of the condensation nuclei to serve as a center of water droplet formation for increasing the size of the nuclei to a point where it can be directly measured using known light scattering and/or absorption techniques.

One known condensation nuclei detector using the above principles and which has been employed satisfactorily in the past to monitor gaseous atmospheres for their condensation nuclei count, is described in U.S. Pat. No. 3,037,421 issued June 5, 1962. The condensation nuclei detector described in this patent is a continuously operable instrument having a fast response, and relatively good accuracy, and comprises an expansion chamber which is adapted to hold air or other gaseous samples containing condensation nuclei to be monitored with the expansion chamber being traversed by the light beam of an electro-optical detector. Input and output conduits to the expansion chamber are controlled by a synchronously operated pair of rotary valves which permit a controlled operating cycle. Following the periodic or cyclical introduction of a specimen of a sample gaseous atmosphere to be tested for condensation nuclei into the expansion chamber, a pressure difference suddenly is established between the expansion chamber and a source of extremely low pressure provided by a vacuum pump, etc. For this purpose, the outlet valve in the output conduit operates to permit expansion of the gas sample in the expansion chamber periodically into the source of lower pressure gas comprised by a vacuum pump, etc. In this manner, a very rapid or sudden expansion of the gaseous sample is achieved whereby precise control of the level of supersaturation of the gaseous sample (which previously has been passed through a humidifier to achieve approximately 100 percent relative humidity), is made possible. As a result, small water droplets are formed about the condensation nuclei as centers, and a count is obtained of the resulting magnified condensation nuclei through the medium of the electro-optic detecting device that derives an electric output signal representative of the number of condensation nuclei. While this known condensation nuclei detector is satisfactory for many purposes, it cannot be used readily to measure accurately the condensation nuclei contained in gaseous atmospheres over a wide range of particle concentrations, without requiring substantial redesign.

The above briefly described known condensation nuclei detector further requires the use of synchronously operated valves in the inlet and outlet passageway to the expansion chamber, and these passageways comprise the only path by means of which a sample gaseous atmosphere being monitored can flow from a sample inlet probe or other intake arrangement through the expansion chamber to the vacuum pump or other source of low-pressure gas. Consequently, during the portion of an operating cycle while an expansion and count of the condensation nuclei is being obtained, gas flow through the instrument and any associated auxiliary equipment, such as diffusion box, connected in the flow path, temporarily is stopped. This in effect, results in a pulsating or irregular, flow interrupting, sampling process in contrast to a continuous flow of the sample gas.

Continuous flow is particularly needed where auxiliary apparatus is involved in making a measurement of a gaseous atmosphere. For example, in measuring the diffusion loss of a flowing aerosol, the size is calculated on the assumption that the flow is uniform (which even then is an extremely difficult calculation) and this is accomplished with auxiliary apparatus in the form of a diffusion box. When the flow is nonuniform (as occurs with the prior art condensation nuclei meter described above) possible errors exist due to turbulence in the diffusion box which to data cannot be calculated. Further, the mobility of the particles is related to their size and again the calculations depend upon the assumption of constant flow. For some applications the nonuniform flow can be shown to introduce no serious error, but there are other situations in which serious errors will occur. By maintaining a substantially constant or continuous flow as shown hereinafter, the uncertainty or real error of nonuniform flow is eliminated.

In addition to the above considerations, using diffusion loss measuring arrangements employing the prior art CN meter described above, the calibration of the arrangement is correct at only one flow. This can require costly and inconvenient arrangements in measuring mobility and/or diffusion loss. For example, for both measurements the loss is a function of the flow rate, and where only one flow rate can be used, several diffusion boxes are needed to cover the range of sizes occurring in natural aerosols. The diffusion boxes are of precision mechanical construction and are costly. With a variable flow rate a single diffusion box can be used and the desired loss obtained by changing the flow through it.

SUMMARY OF INVENTION

It is therefore a primary object of the invention to provide a new and improved variable rate, continuous flow condensation nuclei meter capable of accurately and readily monitoring a continuously flowing stream of a gaseous atmosphere for condensation nuclei particles over a wide range of particle concentrations.

Another object of the invention is to provide such a continuous flow nuclei meter which does not require that the gaseous atmosphere to be monitored, be interrupted so as to create turbulence in auxiliary equipment, such as a diffusion box that is used with the condensation nuclei meter.

Still another object of the invention is to provide a novel condensation nuclei meter having the above characteristics, and which is capable of monitoring sample gaseous atmospheres having widely different flow rates. As a consequence the condensation nuclei meter can be used with a single diffusion box to measure a wide range of sizes of naturally occurring aerosol particles and also can be used to measure a wide range of particle concentrations.

In practicing the invention a variable rate, continuous flow condensation nuclei meter is provided which comprises a housing defining an expansion chamber and having inlet and outlet passageways to the expansion chamber for introducing into and withdrawing from the expansion chamber specimens of an atmosphere to be monitored for condensation nuclei. Valving means are disposed in the inlet and outlet passageway for selectively opening and closing the passageways. A source of low pressure such as a vacuum pump is connected to the outlet passageway for providing a differential flow of a sample gaseous atmosphere from an intake probe through the expansion chamber with the inlet and outlet valving means in an open condition. Means are provided for periodically closing the inlet and outlet valving means simultaneously for at least a short time duration sample interval to thereby trap a specimen of the sample gaseous atmosphere in the expansion chamber during the sample interval. During the sample interval, the pressure in the expansion chamber is then suddenly decreased to thereby form water droplets about the condensation nuclei entrained in the specimen as condensation centers. A radiant energy irradiating and detecting means is positioned to view the interior of the expansion chamber and is operative during the sample interval to derive an output electric signal representative of the intensity of radiant energy scattered by small liquid droplets formed on the condensation nuclei as centers upon the occurrence of the sudden decrease in pressure, and the magnitude of the output electric signal thus derived comprises a measure of the number of condensation nuclei contained in the specimen of the gaseous atmosphere being tested. Following the measurement, the expansion chamber is returned to its preexpansion pressure value. A bypass flow path is connected in parallel with the expansion chamber intermediate the input to the inlet passageway valving means and the outlet of the outlet passageway valving means for providing a continuous flow path for a sample gaseous atmosphere around the expansion chamber during the periodic sample intervals. Means may be provided in the bypass flow path for restricting the flow rate through the bypass flow path relative to the expansion chamber during the intervals that the inlet and outlet passageway valving means are open whereby during such intervals a portion of the sample gaseous atmosphere being monitored flows through the expansion chamber and during the sample interval substantially all flow takes place through the bypass path and a continuous flow rate is maintained over a complete operating cycle and from one operating cycle to the next.

In addition to the above apparatus, the invention further includes means for variably controlling the flow rate of a sample gaseous atmosphere through the condensation nuclei meter by variably controlling the size of a restriction located in a common part of the flow path intermediate the juncture of the bypass flow path with the outlet from the expansion chamber and the source of low-pressure gas.

In a preferred form of the invention, the means for suddenly decreasing the pressure in the expansion chamber comprises a third access path to the expansion chamber, a flexible closure member closing the third access path, and an expansion cavity into which the flexible closure member can be suddenly stretched or expanded to thereby produce the sudden decrease in pressure in the expansion chamber during the sample interval. For this purpose, means are provided for stretching or expanding the flexible closure member into the expansion cavity during the sample interval and thereafter allowing it to return to its normal quiescent condition. This last mentioned means may comprise a rotary valve for periodically subjecting the flexible closure member and the expansion cavity to the vacuum pump whereby a pressure differential is produced across the flexible closure member to cause it suddenly to stretch or expand into the expansion cavity thereby producing a sudden decrease in pressure in the expansion chamber. In addition to this apparatus, a sample interval time period adjusting device is provided in the form of a venting passageway connected between the expansion cavity and a source of higher pressure gas such as atmospheric pressure. A control means in the form of a replaceable capillary tube is interposed in this venting passageway for adjustably controlling the flow rate through the venting passageway to thereby variably control the time period required for the expansion cavity to be returned to an equilibrium condition relative to the interior of the expansion chamber at which point the closure member returns to its normal quiescent or unstretched condition.

BRIEF DESCRIPTION OF DRAWINGS

Other objects, features and many of the attendant advantages of this invention will be appreciated more readily as the same becomes better understood by reference to the following detailed description, when considered in connection with the accompanying drawings, wherein like parts in each of the several Figures are identified by the same reference character, and wherein.

DETAILED DESCRIPTION OF PREFERRED EMBODIMENTS

Figure 1:
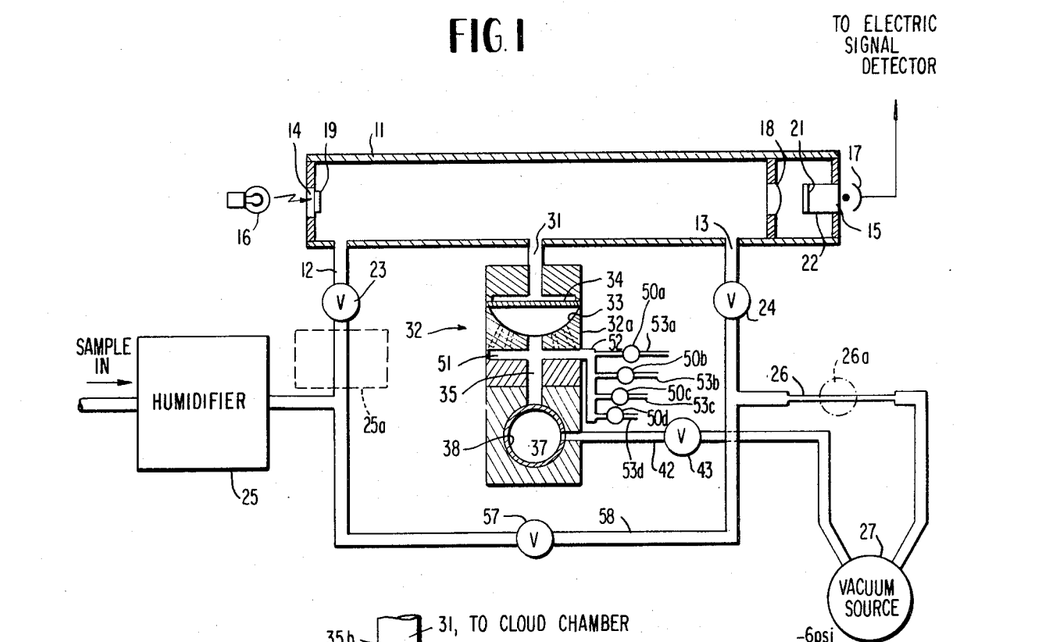
FIG. 1 is an overall schematic view of a new and improved variable rate, continuous flow condensation nuclei meter constructed in accordance with the invention.

The new and improved variable rate, continuous flow condensation nuclei meter shown in FIG. 1 is comprised by an expansion chamber 11 having an inlet passageway 12 and an outlet passageway 13 for supplying specimens of a sample gaseous atmosphere to be monitored to the interior of the expansion chamber 11. Expansion chamber 11 may comprise a cylindrically shaped member formed from glass, metal, plastic or other suitable substance which will not react with the gaseous atmospheres introduced into its interior. The end of the expansion chamber 11 has transparent enclosures shown at 14 and 15 by means of which light from a source 16 connected at one end of the expansion chamber can be either directly transmitted or indirectly transmitted via light scattering paths to a suitable electro-optical pickup device 17 that may comprise a photocell, photomultiplier, phototransistor, or some other suitable light sensitive device for converting the light energy to a corresponding electrical signal representative of the intensity of the light impinging on the device 17. The elements 16 and 17 comprise parts of an overall optical system which further includes a focusing lens 18 and light stops 19 and 21 with the stop 21 being supported by spaced-apart struts 22 in front of transparent enclosure 15. The optical system thus comprised prevents direct transmission of light from the source 16 to the photoelectric pickup device 17, and requires scattering of the light within the interior of expansion chamber 11 by small droplets of water formed about condensation nuclei as centers in order to provide any light to the light sensitive surface of the photoelectric device 17. Such an optical system is well known in the art, and has been described previously in publications such as the above-identified U.S. Pat. No. 3,037,421.

For a more detailed description of the construction and operation of the electro-optical light radiating and detecting system comprised by elements 16–22, reference is made to U.S. Pat. No. 3,037,421. However, because the system is entirely conventional in its construction and operation, it is believed that the above brief description is adequate to indicate the manner in which an electric output signal is derived from the photoelectric pickup 17. The magnitude of this output electric signal is representative of the number of condensation nuclei contained in the gaseous sample being monitored by the meter. The output electric signal derived by the photoelectric pickup device 17 is supplied through suitable amplifying circuitry to actuate a meter, counter or other similar apparatus (not shown) for providing a visual or other indication of the count of the condensation nuclei contained in the specimen of gas being tested. Alternatively, a direct light path could be established between the light source 16 and light detector 17, and the formation of the cloud of droplets serves to modulate the light beam through both absorption or light scattering or both, to thereby produce an output signal representative of the number of condensation nuclei present in a sample gaseous atmosphere. For a detailed description of a direct light beam measuring arrangement suitable for use with the invention, reference is made to U.S. Pat. No. 2,791,901 issued May 14, 1957.

An inlet control valve 23 and an outlet control valve 24, the construction of which will be described more fully hereinafter in connection with FIG. 4, control the flow of a test specimen of a sample gaseous atmosphere to be monitored into and out of the interior of the expansion chamber 11. For this purpose, a specimen of an intake sample gaseous atmosphere is supplied through the inlet control valve 23 and inlet passageway 12 from a humidifier 25 having its input connected to a sample intake probe or other gaseous sample collecting inlet device. The humidifier 25 operates to bring the sample gaseous atmosphere to 100 percent relative humidity, and may be of any known construction. For example, humidifier 25 may comprise a sealed compartment having wicks dipped into a water container wherein the inlet sample gaseous atmosphere passes downward between the wicks on one side of a barrier, through a hole in the barrier and back up the other side. By this arrangement, gaseous samples supplied through the humidifier are brought to 100 percent relative humidity. Other types of humidifiers such as bubbling the gas through a bottle of water or other condensable liquid, may be employed. In order to avoid troublesome temperature differentials between the humidifier and the expansion chamber, it is desirable to position the humidifier 25 in close physical proximity to the expansion chamber 11 upon initially setting up the condensation nuclei meter to instrument a process to be monitored. For this reason, as well as to reduce its size, the humidifier may be placed as shown in the dotted outline box 25a.

The outlet control valve 24 has its output connected through a suitable flow rate regulating arrangement shown at 26 (or 26a) to the suction side of a vacuum pump shown at 27 or other comparable source of low pressure whereby with both the inlet and outlet control valves 23 and 24 in their open condition, a differential flow of the sample gaseous atmosphere will take place from the inlet probe through the humidifier and expansion chamber 11 to the vacuum source 27. For this purpose, a vacuum of about −6 pounds per square inch would be preferred but a lower grade vacuum could be considered adequate. In order to control the value of the pressure differential, and hence the differential flow rate of the sample gaseous atmosphere through the expansion chamber 11 while the inlet and outlet control valves 23 and 24 are in their open state, the flow rate regulating device 26 is included. The regulating device 26 may comprise a capillary, or (as is shown in dotted outline form) a flow controlling valve 26a or other kind of adjustable restriction could be used, for variably controlling the total flow rate through the meter including the expansion chamber 11 and bypass path 58 in parallel. If a capillary 26 is employed, it is desirable that the equipment be designed so that this capillary can be replaced or changed readily in order to accommodate different flow rates. While the vacuum source 27 may comprise the intake side of a vacuum pump, it is preferable to employ an input plenum or other buffer evacuated space at the inlet side of such a pump, and the vacuum source 27 could best comprise this evacuated space. In this manner, the vacuum source 27 could be stabilized at a desired low value sufficient to assure a wide range of flow rates for the sample gaseous atmosphere through expansion chamber 11 by appropriate adjustment of the flow controlling element 26.

As will be explained more fully hereinafter, the inlet and outlet control valves 23 and 24 are opened and closed periodically in a manner such that the closure is simultaneous for at least a short time duration sample interval and results in trapping a specimen of the sample gaseous atmosphere in the expansion chamber 11 during the sample interval. As a consequence of this arrangement, the sample or specimen being measured is at all times during the measurement or sample interval, trapped in a leakproof container. The old rotary valve arrangement described in the above referenced patent gave trouble due to leaks that could not be avoided because of the rotary design. Consequently, if the room where the device operated had 100,000 nuclei/cc. and one tried to read a sample gas with, say 100 nuclei, then a tiny leak would introduce a large error. When the sample gas and the air leaking into the valve had substantially the same nuclei concentration, then the error would be negligible. However, with the present design no such problem exists.

Subsequent to the entrapment of a specimen in the above-described manner, the pressure in the interior of the expansion chamber 11 is suddenly decreased so as to effect adiabatic cooling of the gaseous specimen (which previously had been brought to 100 percent relative humidity in the humidifier 25), causing supersaturation, and in turn condensation of some water vapor about the condensation nuclei as centers of condensation in order to achieve an equilibrium condition of 100 percent relative humidity at the new cooler temperature brought about as a result of the expansion. The resultant water droplets thus formed will then produce a light scattering effect so as to divert some of the light from source 16 around the stops 19 and 21 and produce an output electrical signal whose magnitude is related to the intensity of the scattered light, and hence the number of condensation nuclei particles contained in the specimen gaseous atmosphere. Thereafter, the pressure of the interior of the expansion chamber 11 is allowed to return to normal whereby the water droplets are again evaporated, and the inlet and outlet control valves 23 and 24 are opened to allow the test specimen to be flushed out, and a new test specimen to be introduced into the interior of the expansion chamber. This process is carried out in a continuous flow manner due to the compression of the gas in the expansion prior to opening valves 23 and 24 to initiate a new cycle of operation. The operation is then repeated at periodic intervals without the creation of any substantial amount of turbulence in expansion chamber 11 or associated auxiliary equipment such as a diffusion box due to the fact that the pressure inside expansion chamber 11 is normalized with respect to the inlet passageway pressure prior to opening valves 23 and 24.

Figure 2:
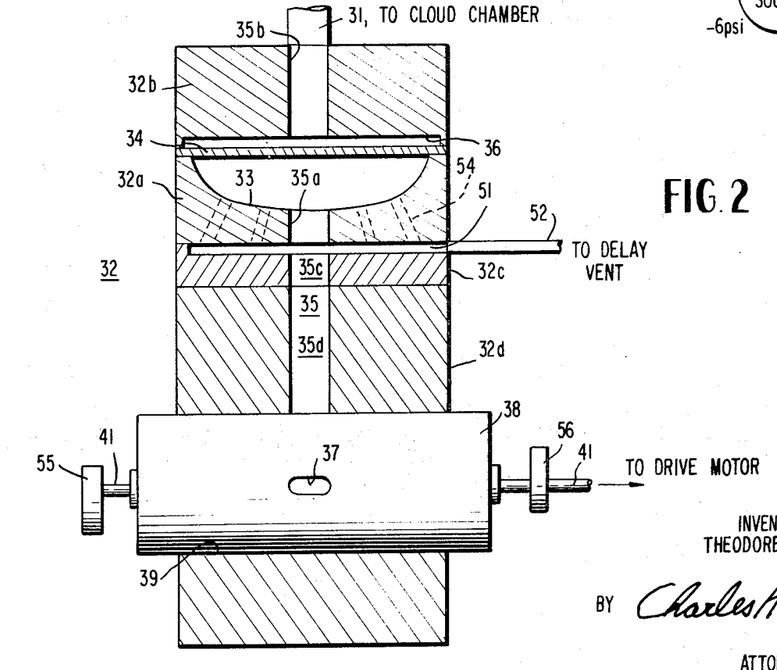
FIG. 2 is a longitudinal sectional view of a portion of the instrument shown in FIG. 1 that comprises the means for suddenly expanding a specimen of a gaseous atmosphere in an expansion chamber to which the apparatus shown in FIG. 2 is connected.

The means for suddenly decreasing the pressure in the expansion chamber 11 is comprised by a third access passageway 31 that is coupled intermediate the interior of the expansion chamber 11 and the input to a rotary valve housing member 32. As best shown in FIGS. 2 and 3, the rotary valve housing member includes a housing segment 32a having a quasispherical cavity 33 formed therein that defines an expansion cavity and that is closed by a flat, flexible, neoprene closure member 34. The neoprene flexible closure member 34 is designed to be sandwiched between the housing segment 32a and a housing segment 32b to which the access port 31 is connected. The housing segment 32b includes a central passageway 35b that communicates directly with the access passageway 31 and terminates in a plurality of radiating grooves 36 (best shown in FIG. 3D of the drawings) which insure that one side of the flat neoprene closure member 34 in its flat, normal, unstretched quiescent condition will be exposed to the pressure of the atmosphere contained in the expansion chamber 11.

Figure 3A:
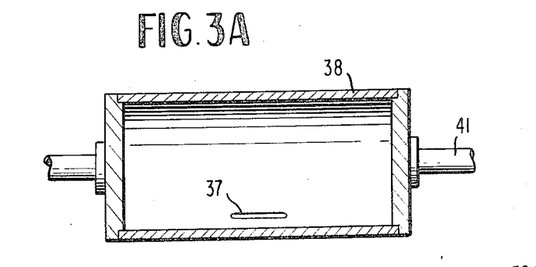
FIG. 3 is a detailed perspective view of the apparatus shown in FIG. 2 after disassembly of the several parts thereof.
Figure 3B:
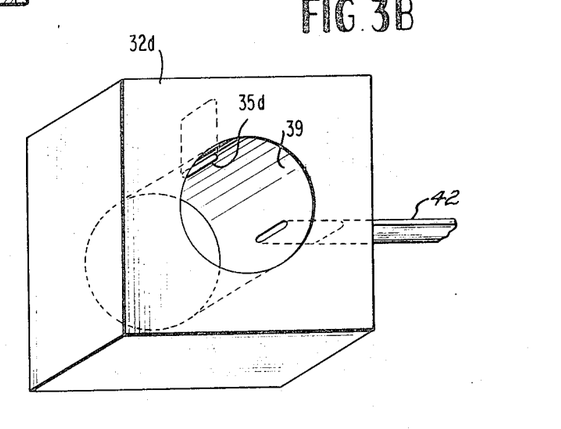

The interior of the expansion cavity 33 is coupled through a central passageway 35a formed in the housing segment 32a and aligned with a central passageway 35c formed in a housing segment 32c that is sandwiched between the housing segment 32a and a rotary valve housing segment 32d. The rotary valve housing segment 32d includes a passageway 35d that is axially aligned with the central passageway 35a and 35c and with an operating or port 37 formed in a rotary valve member 38. As is best shown in FIGS. 3A and 3B of the drawings, the rotary valve member 38 comprises a hollow cylindrical rotor member which is journaled in a central bore 39 formed in the rotary valve housing segment 32d, and is rotatably driven by a central shaft 41 that is coupled to and rotated by a suitable drive motor (not shown). As best seen in FIG. 1 and FIG. 3B of the drawings, the rotary valve housing segment 32d also includes a passageway 42 which is coupled over a suitable conduit to the vacuum source or pump 27. A control valve or other adjustable restriction shown at 43 is included in the passageway 42 for adjustably controlling the degree of vacuum or low pressure to which the interior of the rotary valve member 38 is exposed. This should be sufficient to flex or stretch diaphragm 34 into expansion cavity 33 as described hereinafter.

By reason of the above arrangement, the rotary valve drive motor is adjusted to rotate the rotor member 38 at some predetermined speed. The direction or rotation of rotor member 38 is such that the opening or port 37 in rotor 38 is first exposed to the first passageway 42 providing communication to the low-pressure vacuum source 27. The rotor then is rotated to place opening 37 into alignment with the second passageway 35d, and passageways 35c and 35a providing communication to the expansion cavity 33. As a consequence, the interior of the rotor member 38 will first be drawn down to a low pressure or vacuum corresponding to that of the vacuum source 27, and thereafter upon rotating into alignment with the passageway 35, serves to draw down the expansion cavity 33 to a similar or slightly higher pressure level due to the increased volume. This results in producing a pressure differential between the upper and lower sides of the neoprene flexible closure member 34 so that it is caused to be expanded or stretched into the expansion cavity 33 and results in a sudden expansion or drop in pressure within the expansion chamber 11.

Following the expansion, the neoprene flexible closure member 34 will be allowed to return to its straight or nonstretched, normal quiescent condition shown in FIG. 2 due to its own elasticity and normalizing pressure on both sides of the member, and results in returning the pressure in the expansion chamber 11 to its normal equilibrium value. This in turn results in reevaporating the water droplets previously formed around the condensation nuclei by returning the atmosphere from a lower pressure supersaturated to a saturated condition having 100 percent relative humidity at the increased pressure, and in substantially the same state that it was in at the initiation of the sample interval. Subsequently, the inlet and outlet control valves 23 and 24 will be opened to flush out the specimen that has been tested, and introduce a new specimen to initiate a new operating cycle, all without any pulsating inrush to the larger volume expansion chamber 11 due to the fact that its pressure previously has been normalized prior to the opening of inlet valve 23.

In order to measure the number of condensation nuclei in gaseous atmospheres having a wide range of particle concentrations, it is necessary to control the length of time that water droplets are allowed to grow around each condensation nuclei as a center. For example, if in measuring very dilute concentrations of say 500 particles per cubic centimeter of gas, the growth time or period is comparatively long (relative to the growth period for higher concentrations of particles), the water droplets formed around each particle will grow sufficiently large to attenuate or scatter a comparable amount of light to that attenuated or scattered by larger concentrations but which are not allowed to grow water droplets for so long a period of time. Thus, by controlling the length of time that water droplets are allowed to grow around each condensation nuclei as centers, the instrument can be made to respond to more dilute concentrations of particles and yet produce just about the same output signal level as that obtained with higher concentrations of particles. With the higher concentrations of particles, it is necessary to shorten the length of time or period of growth of the water droplets, otherwise they will grow to such a size that they interfere with each other, and result in operation of the instrument in a saturation or nonlinear region of its operating characteristic. It will be appreciated therefore that by controlling the length of time or period of water droplet growth, the sensitivity of the instrument (gain) to more dilute or higher concentrations of particles can be appropriately adjusted. The period of water droplet growth can be controlled by controlling the length of time the diaphragm or flexible closure member 34 remains in its expanded condition. This then results in controlling the length of time or period of the sample interval.

Figure 3C:
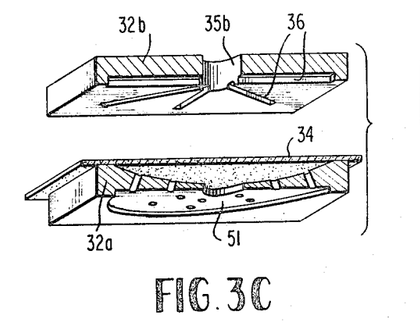

To adjust or variably control the relative speed of return of the flexible closure member 34 to its normal, quiescent, unstretched condition, a sample interval time period-adjusting means is provided and is coupled to the expansion cavity 33. In the embodiment of the invention shown in FIG. 1, this means is comprised in part by a housing segment 32c which is disposed intermediate the housing segment 32a containing expansion cavity 33 and the rotary valve housing segment 32d, and is provided with a venting chamber 51. Alternatively, as shown in FIG. 3c, the venting chamber 51 may be formed on the side of housing segment 32a opposite the expansion cavity 33. The venting chamber 51 in turn is connected to a venting passageway 52 for venting the chamber 51 to a source of higher pressure gas such as atmospheric pressure. The venting passageway 52 includes a means 53 which is interposed in the venting passageway for adjustably controlling the flow rate of gases through the venting passageway 52 to the venting chamber 51.

The venting chamber 51 communicates through a plurality of radially extending ports or passageways 54 formed in the housing segment 32a and extending between the venting chamber 51 and the expansion cavity 33. The flow rate control means 53 disposed in the venting passageway 52 may comprise a capillary tube or tubes 53a–53d, a flow restricting control valve, or some other suitable device for adjustably controlling the flow of a higher pressure gas into the venting chamber 51 through venting passageway 52. By appropriate design, the flow controlling device 53, if it comprises a plurality of capillary tubes, can be selectively opened and closed by suitable valving means 50 to utilize capillaries 53a–53d having different diameters so as to adjustably control the rate at which the interior of the venting chamber 51 can be vented to the atmosphere or other higher pressure gas source. By this arrangement, where it become necessary to change scale on the instrument to accommodate a higher concentration of particles, for example, all that need be done is to selectively open an appropriate time constant capillary, and close the remaining capillaries. It is assumed that the plurality of passageways 54 so interconnect the expanding chamber 51 that there is no substantial time lag or delay involved in interconnecting or exposing the interior of the expansion cavity 33 to the pressure of the gas in the expanding chamber 52. Thus, by design and appropriate choice of the size of the capillary 53, the time duration or the period of the sample interval during which the neoprene flexible closure member 34 is allowed to remain in the stretched or expanded condition, can be adjustably controlled.

It will be appreciated, that as a selected capillary 53 leaks the higher pressure gas into the venting chamber 51, that the neoprene closure member 34 gradually will return to its normal quiescent, unstretched, flat condition shown in FIG. 2 within a time period determined by the time delay of a selected capillary 53. This is due to the return of the pressure in the expansion cavity 33 at a time rate determined by the selected capillary 53 to an equilibrium condition relative to the pressure of the interior of the expansion chamber 11 with the member 34 in its normal, unexpanded, quiescent condition to which it naturally returns (due to its elastic nature) in the absence of a pressure differential across it. The time delay provided by the capillary 53 also provides a sufficient obstacle or constriction with respect to the capacity of the rotary valve rotor member 38 so as to allow the rotor member initially to draw down the pressure in the expansion cavity 33 to some sufficiently low value to produce the required differential pressure across the member 34 in order to stretch or expand it in the first instance, prior to the delayed leakage through 53,52 having the above-described effect.

In order properly to synchronize the opening and closing of the inlet and outlet control valves 23 and 24 with the operation of the means for suddenly decreasing the pressure of the interior of the expansion chamber 11, the rotor member 38 has its drive shaft 41 connected in common with a drive cam 55 (shown in FIG. 2) which in turn operates the switch contacts controlling a relay winding that in turn controls the operation of the respective inlet and outlet control valves 23 and 24. It is essential that the timing relation be such that the valves 23 and 24 be closed prior to diaphragm 34 being deflected, and that diaphragm 34 return to its normal quiescent flat condition prior to valves 23 and 24 being reopened in order to avoid any pulsating surge of in-rush into expansion chamber 11.

The common drive shaft 41 may also have a second drive cam 56 secured thereto which cam operates the control switch of an out-of-phase relay actuated control valve 57 shown in FIG. 1. The out-of-phase control valve 57 is not required but if desired it may be connected in a bypass flow path comprised by a conduit 58 connected in parallel with the expansion chamber 11 as shown in FIG. 1 of the drawings. The bypass flow path 58 is essential in order to assure continuous flow during the sample interval, and is connected between the inlet side of the inlet passageway control valve 23 and the outlet side of the outlet control valve 24. By this arrangement, the outlet side of humidifier 25 supplies the bypass path 58 and expansion chamber 11 in common, and the outlet from the expansion chamber 11 and bypass path 58 are commonly connected through the flow controlling capillary 26 or flow restricting control valve 26a to the vacuum source 27. Thus, it will be seen that the humidifier 25 is connected in common to both paths as is the flow rate controlling capillary 26 or valve 26a. If desired, the humidifier may be placed as shown at 25a in FIG. 1 in order to reduce its size and further minimize the effect of temperature differentials. Additionally, for many instruments it will be desirable to replace the electrical solenoid actuated control valves 23, 24 and 57 (if used) with corresponding pneumatically operated control valves positioned in the same locations as valves 23, 24 and 57. If the instrument is thus modified, the rotary control valve 38 can be appropriately designed to include suitably positioned pneumatic pressure controlling openings interconnected with the pneumatic control valves and a source of pneumatic control pressure so as to operate the pneumatic control valves in essentially the same time sequence as that described for the electrical solenoid control valves. Since such redesign of the instrument to incorporate pneumatically controlled valves is believed obvious to one skilled in the art, a further detailed description and drawing of such modification is believed unnecessary.

The cam 56 which actuates the control valve 57 in bypass path 58 is designed to close the control valve 57 substantially 180° out-of-phase with the opening and closing of the inlet and outlet passageway control valves 23 and 24. However, the out-of-phase control valve 57 is not essential since the pressure drop in expansion chamber 11 or bypass path 58 is quite small compared to the pressure drop across 26 or 26a. Therefore, the flow through the condensation nuclei meter will be maintained substantially constant whether the expansion chamber 11 is closed by the valves 23 and 24, or not. The pressure drop across 26 or 26a normally will be some 200 millibars, while the pressure drop in expansion chamber 11 or bypass 58 is only a few millibars. If all the flow goes through bypass path 58 due to 23 and 24 being closed, the pressure drop is only a few millibars greater than when it is divided between 11 and 58. Thus, if a flow meter were positioned at 26 to read flow rate, the reading would be steady irrespective of whether 23 and 24 were open or closed. In operation, valves 23 and 24 need only to be opened and then shut to capture a sample specimen to be expanded while flow regulating device 26 controls total flow. The division of this flow between 11 and 58 is relatively unimportant. It is desirable to have enough flow in expansion chamber 11 to clear out the air used in the preceding expansion. However, even this is not essential since the same air, if retained in part, will produce the same proportional effect on the output signal derived and a time average of consecutive expansion will be produced in the output.

In operation, by reason of the above arrangement, it will be seen that while the inlet and outlet passageway control valves 23 and 24 are in their open condition a differential flow can take place between the sample gas inlet through humidifier 25 and expansion chamber 11 to the vacuum source 27. The bypass path 58 will be closed by the control valve 57, if it is used, or alternatively some flow takes place through 58. Conversely, during the sample interval the inlet and outlet control valves 23 and 24 are closed, and the bypass control 57 (if used) will be open so that a differential flow can take place from the sample source through humidifier 25, through bypass path 58 and flow controlling means 26 to the vacuum source 27. Under either circumstance 26 (or 26a) controls the flow rate. The arrangement is such that during the open intervals of the inlet and outlet passageway control valves 23 and 24, a portion at least of the sample gaseous atmosphere being monitored flows through the expansion chamber, and during the sample interval substantially all flow takes place through the bypass path. Thus, a continuous flow rate will be maintained over a complete operating cycle and from one operating cycle to the next. Hence, because of the continuous flow thus derived, no turbulence due to pulsating flow, etc., is introduced into auxiliary equipment such as a diffusion box, used with the condensation nuclei meter.

In order to adapt or change the instrument over from use with a flow rate of a given value to a second or different flow rate, it is necessary to adjust the flow restricting capillary 26 or control valve 26a to the desired new flow rate whereby the sample gaseous atmosphere passing through the condensation nuclei meter is appropriately representative of the atmosphere to be measured without any other adjustments and with no affect on calibration. The speed of rotation of the rotary valve member 38, and accordingly, the speed of opening and closing of the inlet and outlet and bypass valves 23, 24, and 57 (if used), respectively, are designed so as to accommodate a wide range of particle concentrations.

If it is necessary to effect a scale changing adjustment to the instrument in order to accommodate measurement of condensation nuclei in a gaseous atmosphere having a highly dense concentration, for example, then appropriate control valve arrangements can be built into the instrument to connect in a capillary 53 having a shorter time constant than the one previously employed. For example, assume that the instrument previously had been adjusted to render capillary 53a effective by opening its valve 50a, while maintaining all other capillaries 53a–53d closed. Because of the change in particle concentration, it then becomes necessary to close capillary 53a providing a long time constant growth period, and to open capillary 53b which provides a shorter time constant and hence shorter time period sample interval. In this manner scale changing to accommodate widely varying concentrations of particles readily can be readily accomplished while maintaining accuracy and linearity of measurement with the instrument.

Figures 3D, 4:
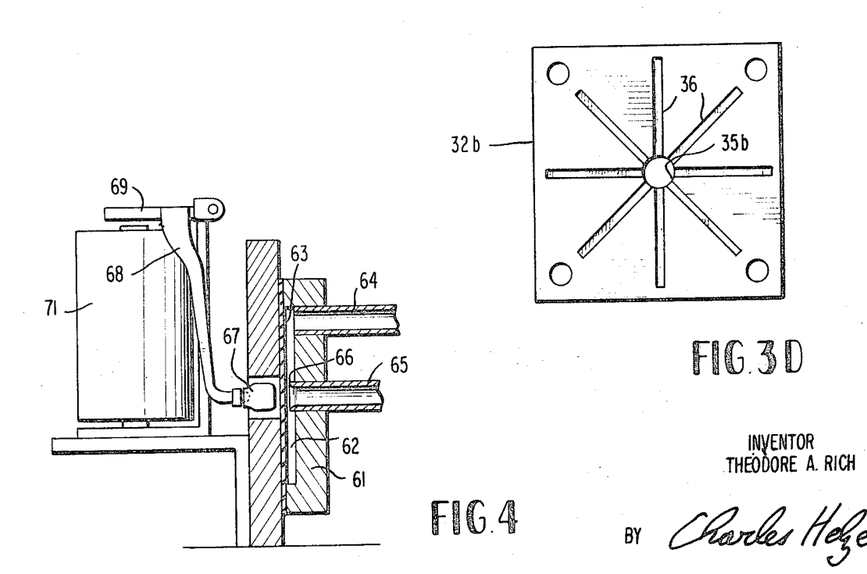
FIG. 4 is a schematic cross-sectional view of the construction of a suitable, relay operated, flow controlling valve used with the instrument shown in FIG. 1.

FIG. 4 is a cross-sectional view of the construction of a suitable, relay actuated control valve construction that can be used as the inlet and outlet control valves 23 and 24 and the bypass control valve 57. The control valve shown in FIG. 4 is comprised by a valve body member 61 having an internal cavity 62 closed by a flexible neoprene closure member 63. An inlet passageway 64 is connected to the interior cavity 62 to provide for access to the cavity 62, and an outlet passageway 65 is provided to allow egress from the cavity 62. The outlet passageway 65 has a raised lip portion 66 which is disposed opposite a pusher member 67 disposed on the opposite side of the flexible neoprene closure member 63. The pusher member 67 may be formed of teflon, or some other suitable nonabrasive material for acting against the neoprene closure member 63. The pusher member 67 is secured to the end of a lever arm 68 that in turn is actuated by the armature 69 of a relay having its winding disposed in the housing 71. The relay housing 71 is mounted on suitable brackets so as to dispose the pusher member 67 opposite the raised lip portion 66 of outlet passageway 65.

In operation, sample gases to be supplied through the control valve are admitted into the interior cavity 62 through the inlet passageway 64. With the valve in its open position shown in FIG. 4, the gases will flow freely through inlet passage 64 into cavity 62 and out of the open outlet passageway 65. Upon the relay winding 71 being actuated to close the control valve, armature 69 will be retracted so as to thrust the lever arm 68 forwardly. This results in bringing the pusher 67 into engagement with the neoprene flexible closure member 63 and presses it closed over the raised lip portion 66 of outlet passageway 65. As a consequence, no further flow of gases through the flow valve can take place. It will be appreciated, therefore, that by suitably connecting the respective actuating windings of the relays 71 to the cam operated switches that are opened and closed by cams 55 and 56, desired sequential operation of the control valves can be obtained synchronously with the rotation of the rotary valve member 38, and hence the periodic expansion that takes place within the interior of the expansion chamber 11.

From the foregoing description, it will be appreciated that the invention provides a new and improved variable rate, continuous flow condensation nuclei meter that is capable of monitoring a continuously flowing stream of a gaseous atmosphere for condensation nuclei without interrupting continuous flow of the sample gaseous atmosphere being monitored so as to avoid introduction of turbulence into auxiliary equipment such as a diffusion box or the like. Further, the new and improved condensation meter is capable of monitoring sample gaseous atmospheres having widely different particle concentrations so as to allow the instrument to be used in a wide number of measuring applications. Further, the invention makes possible the measurement of a wide range of particle sizes while using a single diffusion box.

Having described one embodiment of a new and improved, variable rate, continuous flow condensation nuclei meter constructed in accordance with the invention, it is believed obvious that other modifications and variations of the invention are possible in the light of the above teachings. It is therefore to be understood that changes may be made in the particular embodiment of the invention described which are within the full and intended scope of the invention as defined by the appended claims.

What is claimed is:

1. A variable rate continuous flow condensation nuclei meter comprising housing means defining an expansion chamber, means defining inlet and outlet passageways to said expansion chamber for introducing into and withdrawing from said expansion chamber specimens of an atmosphere to be monitored for condensation nuclei during each measurement cycle, valving means disposed in said inlet and outlet passageways for selectively opening and closing the passageways, means for connecting the outlet passageway to a source of low-pressure gas to provide for differential flow of a sample gaseous atmosphere from a sample intake means for the meter through the expansion chamber with the valving means in an open condition, means for periodically closing said inlet and outlet valving means synchronously for at least a short time duration sample interval for trapping a specimen of a gaseous atmosphere to be monitored in the expansion chamber during the sample interval, means for suddenly decreasing the pressure in the expansion chamber during the sample interval with the valving means in a closed condition and for returning the pressure in the expansion chamber to substantially its predecompression value prior to opening the valving means and initiating a new measurement cycle, and radiant energy irradiating and detecting means viewing the interior of the expansion chamber and operative during the sample interval to derive an output electric signal representative of the intensity of the radiant energy modified by small liquid droplets formed on the condensation nuclei as centers upon the occurrence of the sudden decrease in pressure in the expansion chamber, the magnitude of the output electric signal thus derived comprising a measure of the number of condensation nuclei contained in the specimen of gaseous atmosphere being monitored.

2. A variable rate continuous flow condensation nuclei meter according to claim 1 further including a bypass flow path connected in parallel with the expansion chamber intermediate the input to the inlet passageway valving means and the outlet of the outlet passageway valving means for providing a continuous flow path for a sample gaseous atmosphere around the expansion chamber during the periodic sample intervals.

3. A variable rate continuous flow condensation nuclei meter according to claim 2 further including means for variably controlling the flow rate of the gaseous atmosphere being monitored though the condensation nuclei meter.

4. A variable rate continuous flow condensation nuclei meter according to claim 3 further including means in the bypass flow path for restricting the flow rate through the bypass flow path relative to the expansion chamber during open intervals of the inlet and outlet passageway valving means whereby during such intervals a portion of the gaseous atmosphere being monitored flows through the expansion chamber and during the sample interval substantially all flow takes place through the bypass path and a continuous flow rate is maintained over a complete operating cycle and from one operating cycle to the next.

5. A variable rate continuous flow condensation nuclei meter according to claim 3 wherein said means for variably controlling the flow rate of the gaseous sample through the condensation nuclei meter comprises adjustable flow regulating means interposed in the flow passageway intermediate the sample intake means for the meter and the source of low-pressure gas and at a point common to the parallel flow paths formed by the expansion chamber and the bypass flow path.

6. A variable rate continuous flow condensation nuclei meter according to claim 1 further including sample interval periodicity adjusting means for variably controlling the time duration of the sample interval period during which the pressure within the expansion chamber is decreased.

7. A variable rate continuous flow condensation nuclei meter according to claim 6 wherein the sample interval periodicity adjusting means comprises replaceable capillary means for variably controlling the size of a venting passageway controlling the time duration of the expansion period provided by the means for suddenly decreasing the pressure within the interior of the expansion chamber.

8. A variable rate continuous flow condensation nuclei meter according to claim 5 further including sample interval periodicity adjusting means for variably controlling the time duration of the sample interval period during which the pressure within the expansion chamber is decreased.

9. A variable rate continuous flow condensation nuclei meter according to claim 8 wherein the sample interval periodicity adjusting means comprises replaceable capillary means for variably controlling the size of a venting passageway controlling the time duration of the expansion period provided by the means for suddenly decreasing the pressure within the interior of the expansion chamber.

10. A variable rate continuous flow condensation nuclei meter according to claim 6 further including humidifier means connected in the inlet path for the sample gaseous atmosphere being monitored in advance of the expansion chamber, and wherein the means for variably controlling the flow rate of the gaseous atmosphere being monitored through the condensation nuclei meter comprises adjustable flow regulating means connected in a common passageway intermediate the common connection point of the bypass path to the outlet of the outlet of means and the source of low-pressure gas.

11. A variable rate continuous flow condensation nuclei meter according to claim 3 wherein said means for suddenly decreasing the pressure in the expansion chamber comprises a third access path to the expansion chamber, a flexible closure member closing said third access path, means defining an expansion cavity into which said flexible closure member can be suddenly expanded to thereby produce a sudden decrease in pressure in the expansion chamber during the sample interval, and means for expanding said flexible closure member into the expansion cavity during the sample interval and thereafter allowing it to return to its normal quiescent unstretched condition.

12. A variable rate continuous flow condensation nuclei meter according to claim 11 further including sample interval time period adjusting means coupled to the means for expanding said flexible closure member into the expansion cavity, said sample interval time period adjusting means serving to adjust the time interval required for the flexible closure member to return from its expanded condition to its normal quiescent unstretched condition whereby a wide range of different condensation nuclei concentrations readily and accurately can be measured with the meter.

13. A variable rate continuous flow condensation nuclei meter according to claim 12 wherein the sample interval time period adjusting means comprises a venting passageway connected intermediate the expansion cavity and a source of higher pressure gas, and means interposed in said venting passageway for adjustably controlling the flow rate of gases through the venting passageway to thereby variably control the time period required for the expansion cavity to be returned to an equilibrium condition relative to the interior of the expansion chamber at which point the closure member returns to its normal quiescent condition.

14. A variable rate continuous flow condensation nuclei meter according to claim 13 wherein said means for expanding said flexible closure member into the expansion cavity comprises rotary valve means for periodically subjecting the flexible closure member and the expansion cavity to a source of low-pressure gas whereby a pressure differential is produced across the flexible closure member to cause it suddenly to expand into the expansion cavity thereby producing a sudden decrease in pressure in the expansion chamber.

15. A variable rate continuous flow condensation nuclei meter according to claim 14 wherein said expansion cavity is defined by a body member having a quasispherical cavity formed therein which has a flat neoprene member that comprises the flexible closure member extending across a diameter of the quasispherical cavity, said body member having a venting chamber to which the venting passageway is connected together with an access port to the rotary valve means, and a plurality of venting ports extending between the venting chamber and the quasispherical expansion cavity.

16. A variable rate continuous flow condensation nuclei meter according to claim 15 wherein the means interposed in the venting passageway for adjustably controlling the flow rate through the venting passageway comprises at least one capillary tube having one end exposed to atmospheric pressure gas.

17. A variable rate continuous flow condensation nuclei meter according to claim 11 wherein said means for expanding said flexible closure member into the expansion cavity comprises rotary valve means for periodically subjecting the flexible closure member and the expansion cavity to a source of low pressure whereby a pressure differential is produced across the flexible closure member to cause it suddenly to expand into the expansion cavity thereby producing a sudden decrease in pressure in the expansion chamber.

18. A variable rate continuous flow condensation nuclei member according to claim 17 wherein said rotary valve member comprises a valve body member having a central cylindrical bore and first and second passageways formed therein, a hollow cylindrical rotor member rotatably supported in the central bore and having an access opening therein axially aligned with the first and second passageways in the valve body member, said second passageway providing communication to the expansion cavity and said first passageway providing communication to the source of low-pressure gas, and means for rotating said rotor member in a direction whereby the access opening therein periodically is radially aligned with the first and second passageways in that order in a serial manner and at a speed suitably proportioned to the range of flow rates of the sample gaseous atmosphere through the expansion chamber.

19. A variable rate continuous flow condensation nuclei meter according to claim 18 further including control valve means disposed in the first passageway intermediate the valve rotor member and the source of low-pressure gas for adjusting the pressure of the gas to which the interior of the hollow rotor member is exposed.

20. A variable rate continuous flow condensation nuclei meter according to claim 19 further including sample interval time period adjusting means coupled to the expansion cavity, said sample interval time period adjusting means serving to adjust the time interval required for the flexible closure member to return from its expanded condition to its normal quiescent condition whereby a wide range of different condensation nuclei concentrations readily and accurately can be measured with the meter.

21. A variable rate continuous flow condensation nuclei meter according to claim 20 wherein the sample interval time period adjusting means comprises a venting passageway connected intermediate the expansion cavity and a source of higher pressure gas, and means interposed in said venting passageway for adjustably controlling the flow rate of gases through the venting passageway to thereby variably control the time period required for the expansion cavity to be returned to an equilibrium condition relative to the interior of the expansion chamber at which point the closure member returns to its normal quiescent unstretched condition.

22. A variable rate continuous flow condensation nuclei member according to claim 21 wherein said expansion cavity is defined by a body member having a quasispherical cavity formed therein which has a flat neoprene member that comprises the flexible closure member extending across a diameter of the quasispherical cavity, said body member having a venting chamber to which the venting passageway is connected together with an access port to the rotary valve means, and a plurality of venting ports extending between the venting chamber and the quasispherical expansion cavity, the means interposed in the venting passageway for adjustably controlling the flow rate through the venting passageway comprises a plurality of capillary tubes each having one end exposed to atmospheric pressure gas, and means for selectively connecting in one of the capillary tubes in the venting passageway to control the flow rate therethrough.

23. A variable rate continuous flow condensation nuclei meter according to claim 22 further including control valve means disposed in the first passageway intermediate the valve rotor member and the source of low-pressure gas for adjusting the pressure of the gas to which the interior of the hollow rotor member is exposed.

24. A variable rate continuous flow condensation nuclei member according to claim 23 further including means in the bypass flow path for restricting the flow rate through the bypass flow path relative to the expansion chamber during open intervals of the inlet and outlet passageway valving means whereby during such intervals a portion of the gaseous atmosphere being monitored flows through the expansion chamber, and during the sample interval substantially all flow takes place through the bypass path and a continuous flow rate is maintained through the condensation nuclei meter over a complete operating cycle and from one operating cycle to the next.

25. A wide range condensation nuclei meter comprising housing means defining an expansion chamber, means defining inlet and outlet passageways to said expansion chamber for introducing into and withdrawing from said expansion chamber specimens of an atmosphere to be monitored for condensation nuclei during each measurement cycle, valving means disposed in said inlet and outlet passageways for selectively opening and closing the passageways, means providing for differential flow of a sample gaseous atmosphere from a sample intake means for the meter through the expansion chamber with the valving means in an open condition, said inlet and outlet valving means being periodically operated for at least a short time duration sample interval for isolating a specimen of a gaseous atmosphere to be monitored in the expansion chamber during the sample interval at which point the pressure in the expansion chamber is suddenly decreased, radiant energy irradiating and detecting means viewing the interior of the expansion chamber and operative during the sample interval to derive an output electric signal representative of the intensity of the radiant energy modified by small liquid droplets formed on the condensation nuclei as centers upon the occurrence of the sudden decrease in pressure in the expansion chamber, the magnitude of the output electric signal thus derived comprising a measure of the number of condensation nuclei contained in the specimen of the gaseous atmosphere being monitored, and sample interval periodicity adjusting means for variably controlling the time duration of the sample interval period during which the pressure within the expansion chamber is decreased.

26. A wide range condensation nuclei meter according to claim 25 wherein the sample interval periodicity adjusting means comprises replaceable capillary means for variably controlling the size of a venting passageway that in turn controls the time duration of the expansion period provided while the pressure in the expansion chamber is decreased.

* * * * *